(12) United States Patent
Jeon et al.

(10) Patent No.: US 12,537,267 B2
(45) Date of Patent: Jan. 27, 2026

(54) BATTERY MODULE

(71) Applicant: SK INNOVATION CO., LTD., Seoul (KR)

(72) Inventors: Hae Ryong Jeon, Daejeon (KR); Yang Kyu Choi, Daejeon (KR); Jeong Woo Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 529 days.

(21) Appl. No.: 17/565,290

(22) Filed: Dec. 29, 2021

(65) Prior Publication Data

US 2022/0209366 A1   Jun. 30, 2022

(30) Foreign Application Priority Data

Dec. 29, 2020  (KR) .................. 10-2020-0185798

(51) Int. Cl.
*H01M 50/581* (2021.01)
*H01M 50/289* (2021.01)
*H01M 50/507* (2021.01)
*H01M 50/524* (2021.01)

(52) U.S. Cl.
CPC ....... *H01M 50/507* (2021.01); *H01M 50/289* (2021.01); *H01M 50/524* (2021.01); *H01M 50/581* (2021.01)

(58) Field of Classification Search
None
See application file for complete search history.

(56) References Cited

U.S. PATENT DOCUMENTS

| | | | | |
|---|---|---|---|---|
| 10,050,315 | B2 * | 8/2018 | Kim | H01M 10/0525 |
| 2013/0323549 | A1 * | 12/2013 | Choi | H01M 50/507 |
| | | | | 429/62 |
| 2014/0065467 | A1 * | 3/2014 | Choi | H01M 50/583 |
| | | | | 174/68.2 |
| 2020/0075913 | A1 * | 3/2020 | Wang | H01M 50/553 |
| 2020/0076025 | A1 * | 3/2020 | Jo | H01M 10/6556 |
| 2020/0144580 | A1 * | 5/2020 | Hong | H01M 50/211 |

(Continued)

FOREIGN PATENT DOCUMENTS

| | | |
|---|---|---|
| KR | 10-2017-0142481 A | 12/2017 |
| KR | 10-2018-0097897 A | 9/2018 |

(Continued)

OTHER PUBLICATIONS

Jang et al. (KR20200104614 (A) and using Machine Translation as English version) (Year: 2020).*

(Continued)

*Primary Examiner* — Milton I Cano
*Assistant Examiner* — Joshua P McClure
(74) *Attorney, Agent, or Firm* — IP & T GROUP LLP

(57) ABSTRACT

A battery module is disclosed. The battery module includes a plurality of sub-modules each including at least one battery cell and an internal bus bar electrically connected to an electrode tab of the at least one battery cell, and a bus bar assembly configured to connect the internal bus bars of the plurality of sub-modules. The bus bar assembly includes a bus bar frame detachably mounted on the plurality of sub-modules, and an external bus bar coupled to the bus bar frame and configured to electrically connect sub-modules adjacent to each other among the plurality of sub-modules.

15 Claims, 11 Drawing Sheets

(56) References Cited

U.S. PATENT DOCUMENTS

| | | | | |
|---|---|---|---|---|
| 2020/0176739 A1* | 6/2020 | You | .................. | H01M 50/24 |
| 2020/0189156 A1* | 6/2020 | Ma | .................. | B29C 45/14655 |
| 2020/0295337 A1* | 9/2020 | You | .................. | H01M 50/50 |
| 2021/0164511 A1* | 6/2021 | Jeong | .................. | H01M 50/204 |
| 2021/0296738 A1* | 9/2021 | Lee | .................. | H01M 50/557 |
| 2022/0123438 A1* | 4/2022 | Kim | .................. | H01M 50/211 |
| 2022/0190444 A1* | 6/2022 | Yoon | .................. | H01M 50/502 |
| 2022/0407197 A1* | 12/2022 | Shin | .................. | H01M 50/503 |

FOREIGN PATENT DOCUMENTS

| | | | | |
|---|---|---|---|---|
| KR | 10-2020-0012189 A | | 2/2020 | |
| KR | 10-2020-0069720 A | | 6/2020 | |
| KR | 20200104614 A | * | 9/2020 | ............ H01M 10/48 |
| KR | 10-2020-0120421 A | | 10/2020 | |
| WO | WO-2020138821 A1 | * | 7/2020 | ............ F16B 33/004 |
| WO | WO-2020209589 A1 | * | 10/2020 | ............ H01M 50/20 |

OTHER PUBLICATIONS

Office Action for Korean Patent Application No. 10-2020-0185798 issued by the Korean Patent Office on May 27, 2025.

\* cited by examiner

BATTERY MODULE

This application claims the priority benefit of Korean Patent Application No. 10-2020-0185798 filed on Dec. 29, 2020, which is incorporated herein by reference in its entirety for all purposes as if fully set forth herein.

TECHNICAL FIELD

The present disclosure relates generally to a secondary battery module.

BACKGROUND

Generally, a secondary battery cell (hereinafter simply referred to as battery cell) is used as an energy source of a mobile device, an electric vehicle, a hybrid vehicle, electricity, and the like. A battery cell may be used in different forms, shapes, and configurations according to the type of the external device where it is applied.

For example, a small-sized mobile device such as a cellular phone may operate for a predetermined time even by the output and capacity of a single battery cell. However, when long operation time and high power driving is required for devices such electric or hybrid vehicles, at least one large-capacity secondary battery module (also referred to herein simply as battery module) may be employed. Battery modules electrically couple together a plurality of battery cells for increased output and capacity.

The battery module may control an output voltage or an output current depending on the number of built-in battery cells. In addition, secondary battery packs (also simply referred to as a battery pack) may be formed by electrically connecting together a plurality of battery modules.

When a plurality of battery cells are connected in series/parallel to constitute a battery pack, a general method includes forming a battery module including a plurality of battery cells and then coupling the plurality of the battery modules together to constitute a battery pack. The number of battery modules included in the battery pack or the number of battery cells included in each of the battery modules may be variously set depending on a required output voltage or charge/discharge capacity.

The battery module thus configured includes a plurality of battery cells stacked together. Bus bars may typically be used for electrically connecting the electrode leads of the plurality of battery cells.

US patent application to 2020-0168887 A1 to Jay-Min Yoo describes a process of coupling a plurality of bus bars to a plurality of battery cells which generally requires a lot of effort and time in the manufacturing process. In addition, if some battery cells in the battery module overheat or catch fire, heat or fire may easily be transferred to other battery cells of the battery module thus expanding the damage. Currently, extensive research and development efforts are being undertaken to improve the safety, capacity and other characteristics of secondary batteries.

SUMMARY

An object of the present invention disclosure (referred to hereinafter also simply as present disclosure or the present invention) is to address the aforementioned and other problems associated with the prior art.

Another object of the present disclosure is to provide a battery module with an improved structure.

Another object of the present disclosure is to provide a battery module with improved stability.

Another object of the present disclosure is to provide a battery module in which a plurality of battery cells are electrically connected by mounting an improved configuration bus bar assembly.

Another object of the present disclosure is to provide a battery module capable of sufficiently maintaining an insulation distance between bus bars.

Another object of the present disclosure is to provide a battery module in which a bus bar assembly is separated from the battery cells.

Another object of the present disclosure is to provide a battery module in which a bus bar assembly is separated from battery cells under a predetermined condition.

In order to achieve the above-described and other objects and needs, according to one aspect of the present disclosure, there is provided a battery module comprising a plurality of sub-modules each including at least one battery cell and an internal bus bar electrically connected to an electrode tab of the at least one battery cell; and a bus bar assembly configured to connect the internal bus bars of the plurality of sub-modules, wherein the bus bar assembly includes a bus bar frame detachably mounted on the plurality of sub-modules; and an external bus bar coupled to the bus bar frame and configured to electrically connect sub-modules adjacent to each other among the plurality of sub-modules.

Important technical effects of a battery module according to the present disclosure include improved structure and improved stability.

According to at least one aspect of the present disclosure, the present disclosure can provide a battery module in which a plurality of battery cells is electrically connected by mounting a bus bar assembly.

According to at least one aspect of the present disclosure, the present disclosure can provide a battery module capable of sufficiently maintaining an insulation distance between bus bars.

According to at least one aspect of the present disclosure, the present disclosure can provide a battery module in which a bus bar assembly is separated from the battery cells under a predetermined condition.

The aforementioned and other features and advantages of the present invention will become apparent to the person with ordinary skill in the art of the invention from the following figures and detailed description. However, it should be understood that the detailed description and specific examples (also referred to herein as embodiments) in the detailed description of the present disclosure are provided merely to help the skilled person to understand the invention and are not intended to limit the scope of the present invention to the scope of these examples only.

It should be understood that various other changes, modifications, and examples falling within the spirit and scope of the present disclosure will become apparent to those skilled in the art from the following figures and detailed description.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

DETAILED DESCRIPTION

Figure 1:
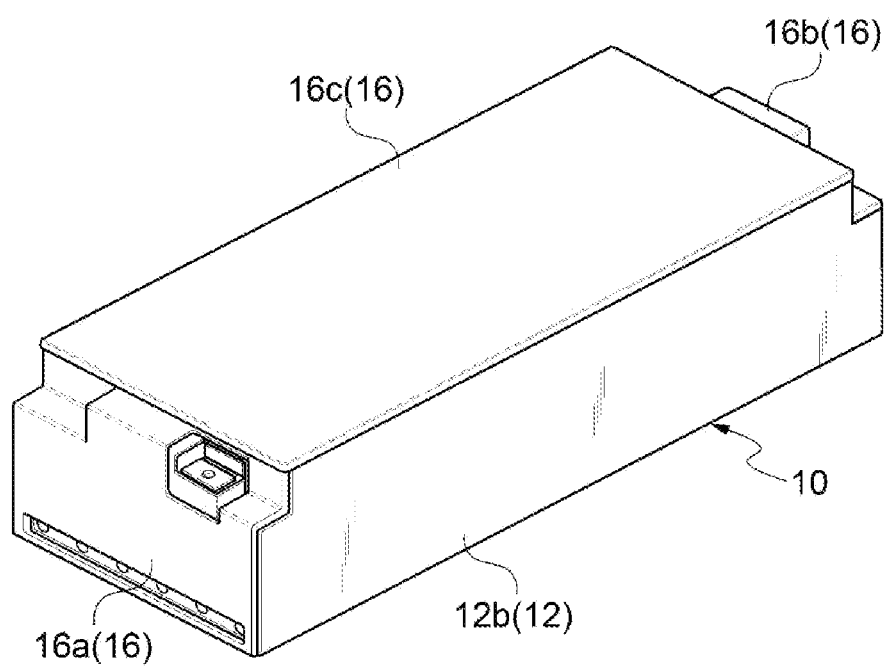
FIG. 1 is a perspective view of a battery module according to an embodiment of the present disclosure.

Reference will now be made in detail to various embodiments of the disclosure which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of well-known features may be omitted for avoiding obscuring the description of the various embodiments of the present invention with well-known features. The accompanying drawings are used to facilitate the understanding of the various technical features and it should be understood that embodiments presented herein are not limited by the accompanying drawings. As such, the present disclosure should be construed to extend to any alterations, equivalents and substitutes in addition to those which are particularly set out in the accompanying drawings.

Terms including an ordinal number such as first, second, etc. may be used to describe various components, but the components are not limited by such terms. The terms are used only for the purpose of distinguishing one component from other components.

When any component is described as "being connected" or "being coupled" to another component, this should be understood to mean that another component may exist between them, although any component may be directly connected or coupled to the other component. In contrast, when any component is described as "being directly connected" or "being directly coupled" to other component, this should be understood to mean that no other component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected to other layers, areas, and components intervening between them. For example, when layers, areas, components, etc. are electrically connected, the present disclosure includes both the case where layers, areas, and components are directly electrically connected, and the case where layers, areas, and components are indirectly electrically connected to other layers, areas, and components intervening between them.

Figure 2:
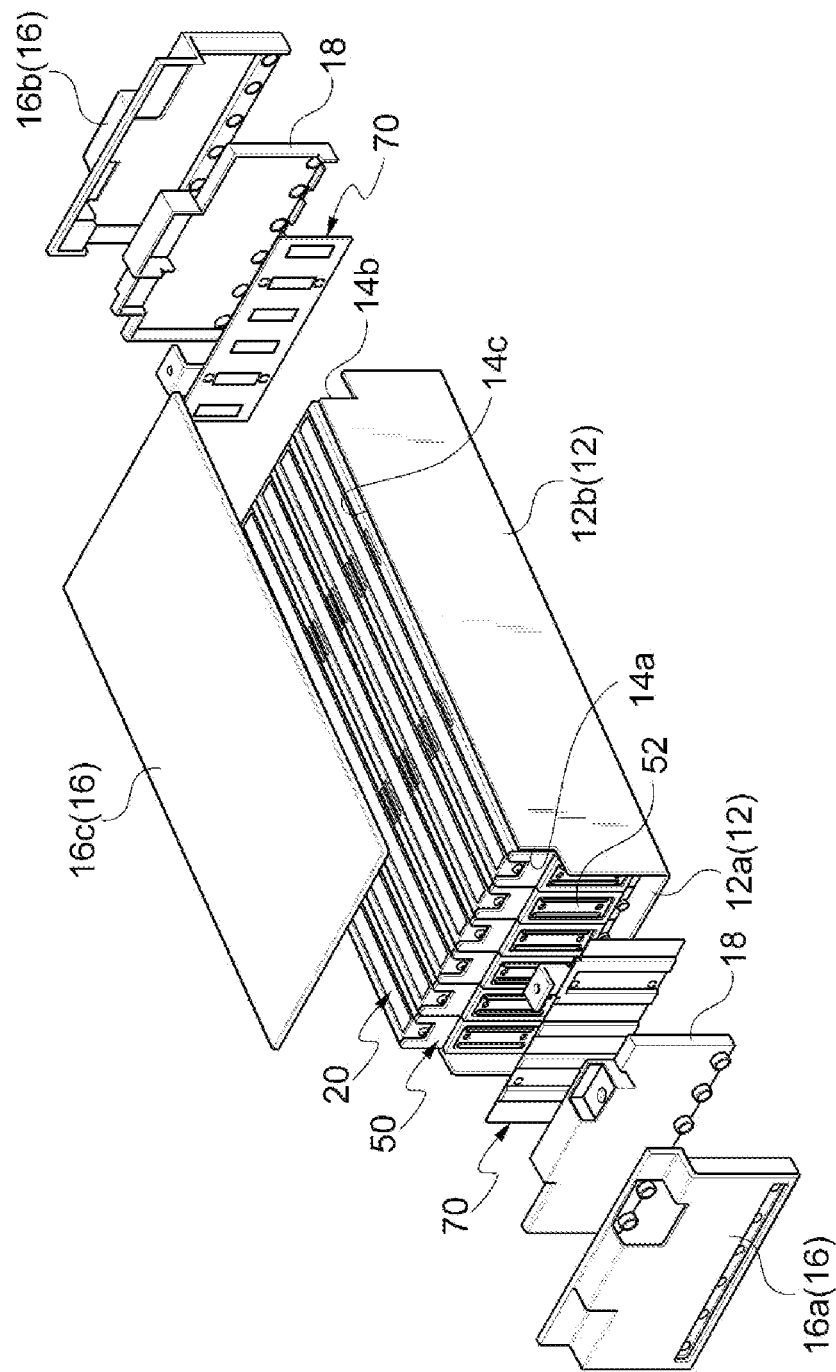
FIG. 2 is an exploded perspective view of a battery module according to an embodiment of the present disclosure.

FIG. 1 is a perspective view of a battery module according to an embodiment of the present disclosure. FIG. 2 is an exploded perspective view of a battery module according to an embodiment of the present disclosure.

A battery module 1 may include a module case 10 and a plurality of sub-modules 20 positioned inside the module case 10.

The module case 10 may form an appearance of the battery module 1. The module case 10 may include a case body 12 forming an inner space and a case cover 16 coupled to the case body 12. The inner space may refer to a space formed inside the case body 12.

The case body 12 may include openings 14a, 14b, and 14c communicating with the inner space. The openings 14a and 14b may be front and rear openings respectively, and the opening 14c may be a top opening. The case cover 16 may cover the openings 14a, 14b, and 14c. The case cover 16 may include a front cover 16a and a rear cover 16b respectively coupled to the front and rear sides of the case body 12 to cover the front and rear openings 14a and 14b, respectively. The case 16 may also include an upper case cover 16c coupled to an upper part of the case body 12.

The openings 14a, 14b, and 14c of the module case 10 may include a first case opening 14a, a second case opening 14b, and a third case opening 14c. The first case opening 14a may be an opening formed in a front part of the case body 12. The second case opening 14b may be an opening formed in a rear part of the case body 12. The third case opening 14c may be an opening formed in an upper part of the case body 12. The first case opening 14a may be referred to as a "front case opening". The second case opening 14b may be referred to as a "rear case opening". The third case opening 14c may be referred to as an "upper case opening".

The front cover 16a may be referred to as a "first cover". The front cover 16a may be positioned in the first case opening 14a. In other words, the front cover 16a may close at least a part of the first case opening 14a. The rear cover 16b may be referred to as a "second cover". The rear cover 16b may be positioned in the second case opening 14b. In other words, the rear cover 16b may close at least a part of the second case opening 14b. The upper case cover 16c may be referred to as a "third cover". The upper case cover 16c may be positioned in the third case opening 14c. In other words, the upper case cover 16c may close at least a part of the third case opening 14c.

The case body 12 may include a lower case 12a forming a bottom surface, and a side case 12b extending from the lower case 12a to form a side surface. For example, the side case 12b may be formed to extend upwardly from each of a first edge and a second edge of the lower case 12a.

The first edge and the second edge of the lower case 12a may face each other and may form a shape extending in a longitudinal direction of the lower case 12a. For example, the first edge and the second edge of the lower case 12a may extend from a front end of the lower case 12a and lead to a rear end of the lower case 12a. The first edge and the second edge of the lower case 12a may also be referred to as side edges or long edges.

For example, the side case 12b may be formed in a pair, and a pair of side cases 12b may face each other. In other words, the case body 12 may have a " ⊏ "-shaped cross-section.

The front part, the rear part, and the upper part of the case body 12 may be opened. However, the present disclosure is not limited thereto. For example, the case body 12 may have a rectangular "▢"-shaped cross section, and only the front and rear parts of the case body 12 may be opened. The case body 12 may form the inner space in which the plurality of sub-modules 20 are seated.

The front cover 16a and the rear cover 16b may cover the first case opening 14a and the second case opening 14b of the case body 12, respectively. The front and rear covers 16a and 16b may refer to at least one of the front cover 16a and the rear cover 16b.

The plurality of sub-modules 20 may be sequentially arranged in one direction. For example, the plurality of sub-modules 20 may be disposed between the first edge and the second edge of the lower case 12a. For example, the plurality of sub-modules 20 may be disposed in a direction from the first edge to the second edge of the lower case 12a. In other words, the plurality of sub-modules 20 may be disposed between the pair of side cases 12b and may be disposed in a direction from one of the pair of side cases 12b to the other.

Each of the plurality of sub-modules 20 may form a shape extending in a longitudinal direction. For example, the longitudinal direction of each of the plurality of sub-modules 20 may be parallel to the longitudinal direction of the lower case 12a. For example, a front end and a rear end of each of the plurality of sub-modules 20 may be adjacent to the front end and the rear end of the lower case 12a, respectively.

A first bus bar assembly 70 may be positioned between the front cover 16a and the plurality of sub-modules 20. A second bus bar assembly 70 may be positioned between the rear cover 16b and the plurality of sub-modules 20. The first and second bus bar assembly 70 may also referred to herein simply as the bus bar assembly 70. The front and rear covers 16a and 16b may be configured to cover respective front and rear insulation covers 18 of the battery module 1. The front insulation cover 18 may be disposed between the front cover 16a and the front bus bar assembly 70. The rear insulation cover 18 may be disposed between the rear cover 16b and the rear bus bar assembly 70. The front and rear insulation covers 18 may be referred to also as the first and second insulation cover 18 or simply as the insulation cover 18.

A plurality of bus bar assemblies 70 may be provided. For example, the plurality of bus bar assemblies 70 may include a bus bar assembly 70 adjacent to the front cover 16a and a bus bar assembly 70 adjacent to the rear cover 16b.

A plurality of insulation covers 18 may be provided. For example, the plurality of insulation covers 18 may include an insulation cover 18 adjacent to the front cover 16a and an insulation cover 18 adjacent to the rear cover 16b.

The insulation cover 18 adjacent to the front cover 16a may be positioned between the bus bar assembly 70 adjacent to the front cover 16a and the front cover 16a. The insulation cover 18 adjacent to the rear cover 16b may be positioned between the bus bar assembly 70 adjacent to the rear cover 16b and the rear cover 16b.

However, as will be described later, the bus bar assembly 70 may include an internal bus bar and a bus bar frame covering bus bars. In this case, since the bus bar frame performs an insulation function, the insulation cover 18 may be omitted.

Figure 3:
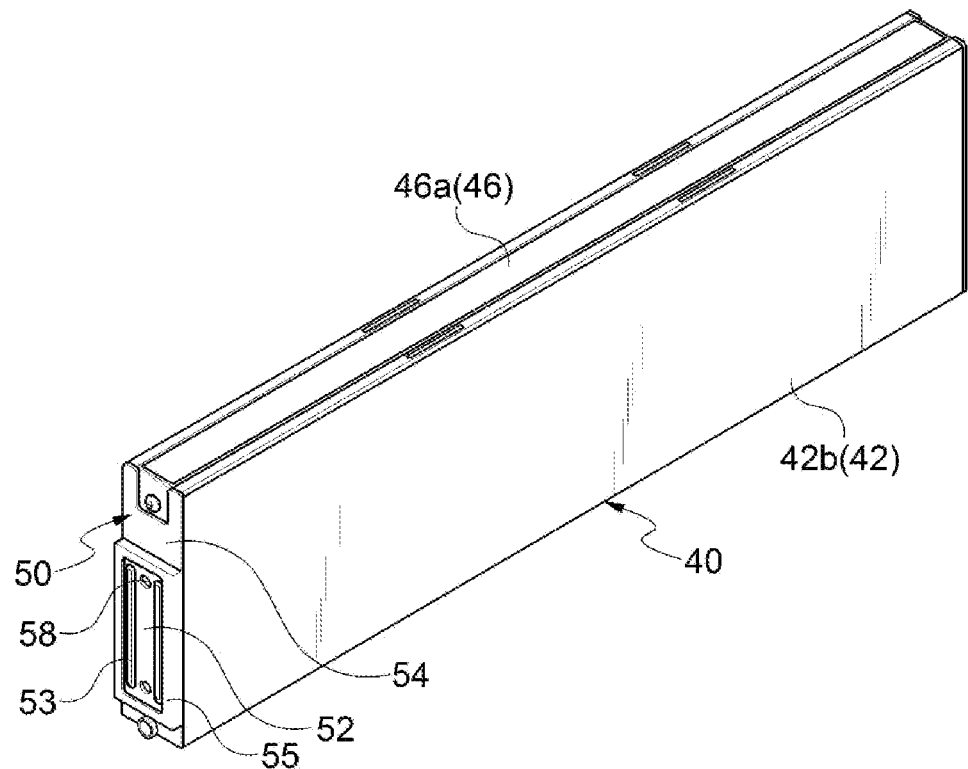
FIG. 3 is a perspective view of a sub-module employed in a battery module according to an embodiment of the present disclosure.
Figure 4:
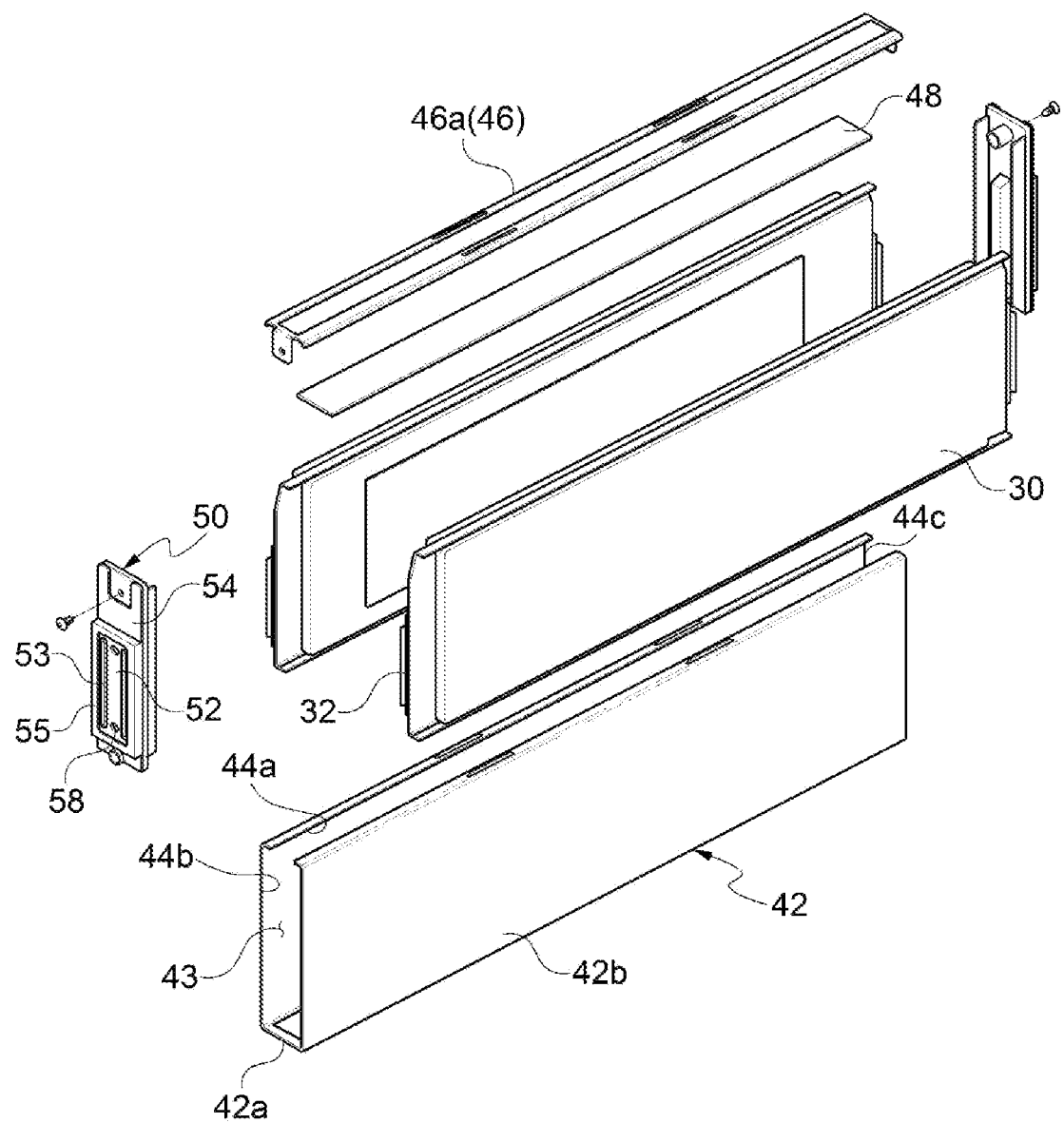
FIG. 4 is an exploded perspective view of a sub-module employed in a battery module according to an embodiment of the present disclosure.

FIG. 3 is a perspective view of a sub-module employed in a battery module according to an embodiment of the present disclosure. FIG. 4 is an exploded perspective view of a sub-module employed in a battery module according to an embodiment of the present disclosure.

The sub-module 20 may refer to one of a plurality of identical sub-modules 20. The sub-module 20 may accommodate at least one battery cell 30.

The sub-module 20 may include a module housing 40 and at least one battery cell 30. For example, referring to FIG. 4, a pair of battery cells 30 may be accommodated in the module housing 40. As another example, one battery cell 30 may be accommodated in the module housing 40.

The module housing 40 may accommodate at least one battery cell 30. The battery cell 30 accommodated in the module housing 40 may be in direct contact with the module housing 40. The module housing 40 may be formed of a thermally conductive material. The module housing 40 may dissipate heat generated in the battery cell 30 to the outside.

For example, the module housing 40 may be formed of a material including aluminum. Two module housings 40 adjacent to each other may be in close direct contact with each other or may be arranged with a heat conduction member interposed therebetween.

The module housing 40 may include a housing body 42 and a housing cover 46 coupled to the housing body 42. The housing body 42 may include openings 44a, 44b, and 44c communicating with a seating space 43, and the housing cover 46 may cover the openings 44a, 44b, and 44c of the housing body 42. The housing cover 46 may include an upper housing cover 46a coupled to an upper part of the housing body 42.

The openings 44a, 44b, and 44c of the housing body 42 may include a first housing opening 44a, a second housing opening 44b, and a third housing opening 44c. The first housing opening 44a is an opening formed in the upper part of the housing body 42 and may be referred to as an "upper housing opening". The second housing opening 44b is an opening formed in a front part of the housing body 42 and may be referred to as a "front housing opening". The third housing opening 44c is an opening formed in a rear part of the housing body 42 and may be referred to as a "rear housing opening".

The housing body 42 may include a lower housing 42a forming a bottom surface. For example, the lower housing 42a may face the lower case 12a (see FIG. 2). For example, the lower housing 42a may extend from a front end in the longitudinal direction and lead to a rear end. The longitudinal direction of the lower housing 42a may be parallel to the longitudinal direction of the lower case 12a (see FIG. 2).

The housing body 42 may include a side housing 42b extending from the lower housing 42a to form a side surface. For example, the side housing 42b may be formed to extend upwardly from each of a first edge and a second edge of the lower housing 42a.

The first edge and the second edge of the lower housing 42a may face each other and may form a shape extending in the longitudinal direction of the lower housing 42a. For example, the first edge and the second edge of the lower housing 42a may extend from a front edge of the lower housing 42a and lead to a rear end of the lower housing 42a.

For example, the side housing 42b may be formed in a pair. A pair of side housings 42b may face each other. In other words, the housing body 42 may have a " ⊏ "-shaped cross-section.

At least one battery cell 30 may be disposed between the pair of side housings 42b. For example, the plurality of battery cells 30 may be disposed between the pair of side housings 42b and may be sequentially disposed in a direction from one of the pair of side housings 42b toward the other.

The "battery cell" may be one of at least one battery cell 30. The battery cell 30 may have a shape extending in one direction. For example, the longitudinal direction of the battery cell 30 may be parallel to the longitudinal direction of the housing body 42. For example, a front end of the battery cell 30 may be adjacent to a front end of the housing body 42 or adjacent to the second housing opening 44b. For example, a rear end of the battery cell 30 may be adjacent to a rear end of the housing body 42 or adjacent to the third housing opening 44c.

The front part, the rear part, and the upper part of the housing body 42 may be opened. However, the present invention is not limited thereto. For example, the housing body 42 have a rectangular-shaped cross section ("□"), and only the front and rear parts of the housing body 42 may be opened. That is, the housing body 42 may form the seating space 43 in which at least one battery cell 30 is seated.

The battery cell 30 may include a bidirectional cell in which electrode tabs 32 having different polarities protrude to opposite sides. However, the shape of the battery cell 30 is not limited thereto. For example, the battery cell 30 may be a unidirectional cell in which the electrode tabs 32 protrude only to one side. At least one battery cell 30 disposed inside the sub-module 20 may be arranged such that the electrode tabs having the same polarity are disposed in the same direction.

That is, as illustrated in FIG. 4, when a pair of battery cells 30 are disposed in the module housing 40, positive electrode tabs may be disposed on one side of the pair of battery cells 30, and negative electrode tabs may be disposed on other side of the pair of battery cells 30. For example, the positive electrode tab may be adjacent to a front end of the module housing 40, and the negative electrode tab may be adjacent to the rear end of the module housing 40.

The electrode tabs 32 of the same polarity in the battery cells 30 may be electrically connected by an internal bus bar 52.

The sub-module 20 may include a bus bar unit 50 coupled to the front and rear of the housing body 42. The bus bar unit 50 may be connected to the housing cover 46. A plurality of bus bar units 50 may be provided. For example, the plurality of bus bar units 50 may include a bus bar unit 50 adjacent to the second housing opening 42b and a bus bar unit 50 adjacent to the third housing opening 42c.

The plurality of bus bar units 50 may be disposed in the housing body 42 to cover the openings 44b and 44c of the housing body 42. The plurality of bus bar units 50 may correspond to the bidirectional electrode tabs 32 of the battery cell 30. For example, the plurality of bus bar units 50 may be respectively disposed at both ends of the battery cell 30.

The bus bar unit 50 may include the internal bus bar 52. The internal bus bar 52 may be connected to the electrode tab 32 of at least one battery cell 30 accommodated in the housing body 42. The position of the internal bus bar 52 may correspond to the position of the electrode tab 32 of at least one battery cell 30.

The internal bus bar 52 may include a connection hole 53. The electrode tabs 32 of the battery cells 30 may be inserted into and fixed to the connection hole 53. The connection hole 53 may be formed in the internal bus bar 52 along a width direction of the battery cell 30. For example, the connection hole 53 may be formed to elongate vertically. The electrode tabs 32 of the battery cells 30 may be fixed and/or coupled to the internal bus bar 52 through welding (see FIG. 10).

The bus bar unit 50 may include a unit body 54. The internal bus bar 52 may be mounted on the unit body 54. The unit body 54 may cover the front and rear housing openings 44b and 44c of the housing body 42. The bus bar unit 50 may be disposed at both ends of the battery cell 30 so that the electrode tab 32 of the battery cell 30 are connected to the internal bus bar 52. The front and rear housing openings 44b and 44c may refer to at least one of the second housing opening 44b and the third housing opening 44c.

Figure 5:
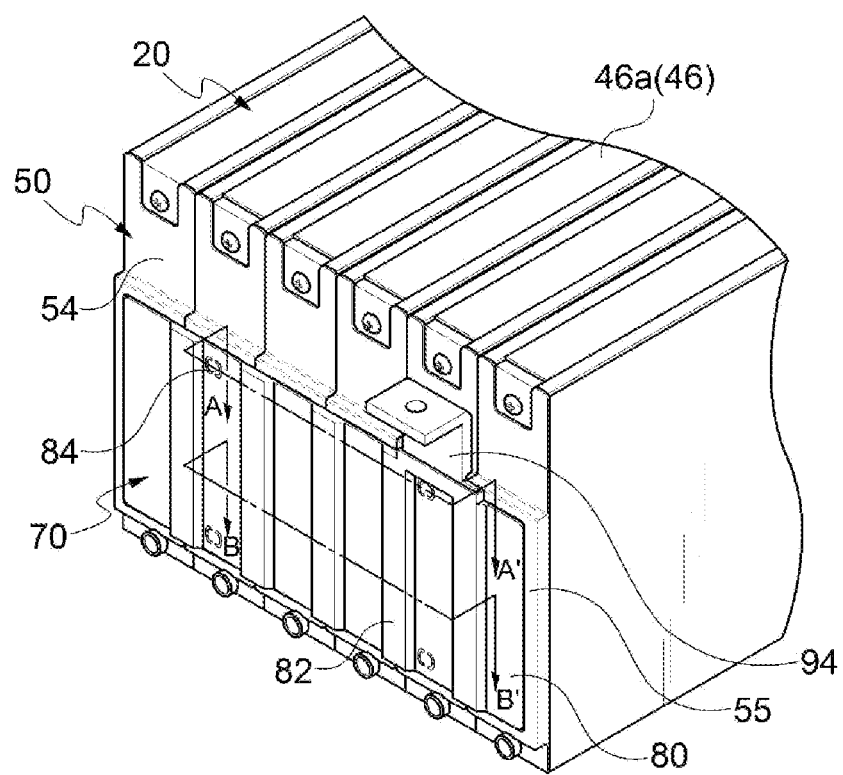
FIGS. 5 and 6 illustrate a plurality of sub-modules stacked together in a battery module and a bus bar assembly of the battery module according to an embodiment of the present disclosure.
Figure 6:
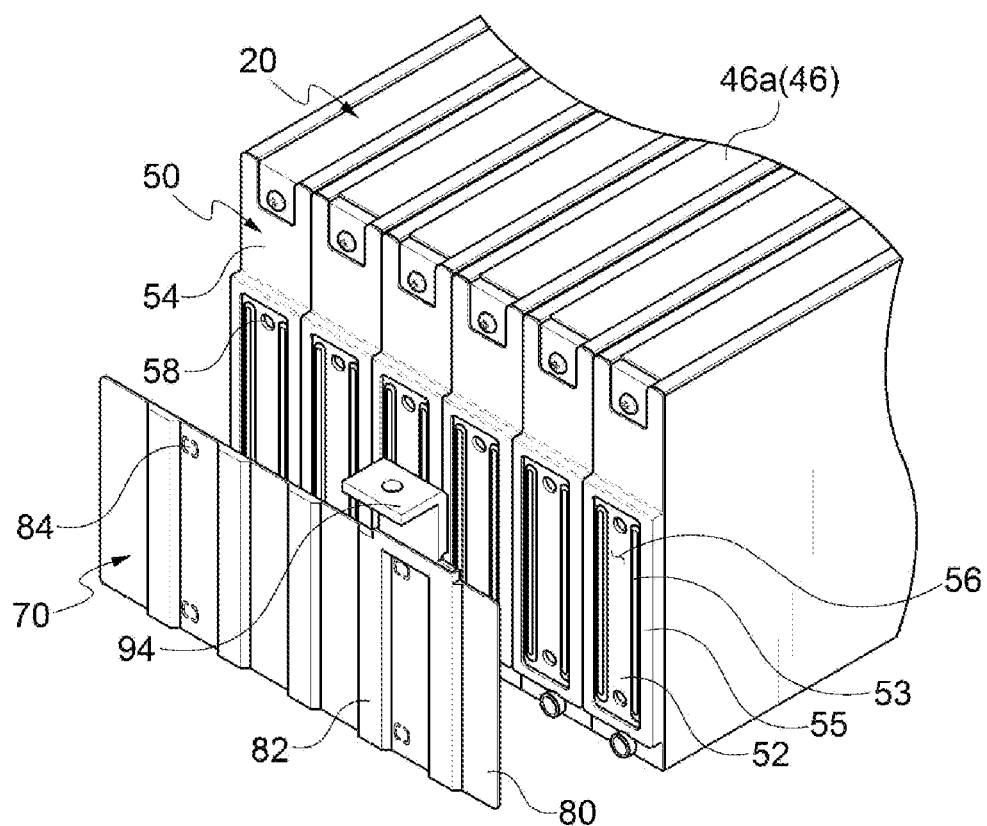
Figure 7:
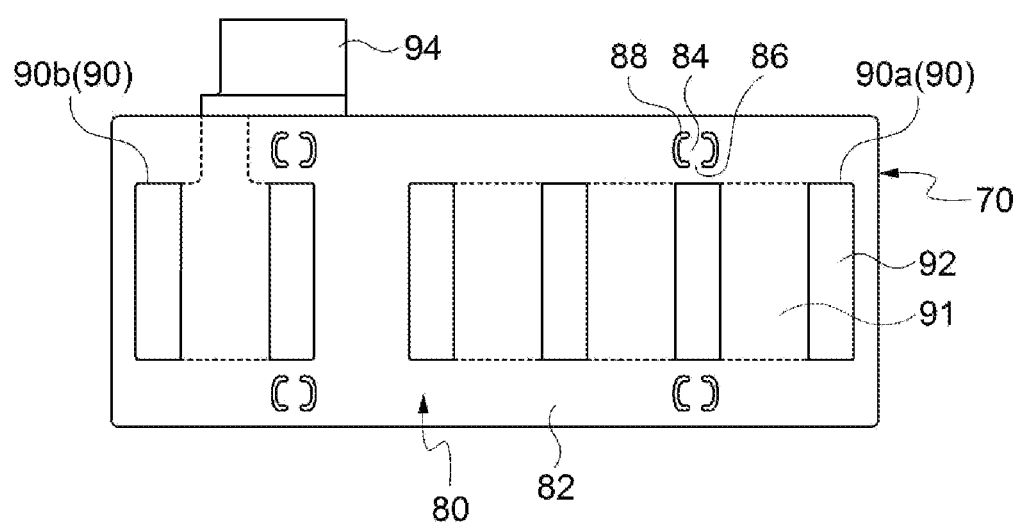
FIG. 7 is a rear view of a bus bar assembly in a battery module according to an embodiment of the present disclosure.
Figure 8:
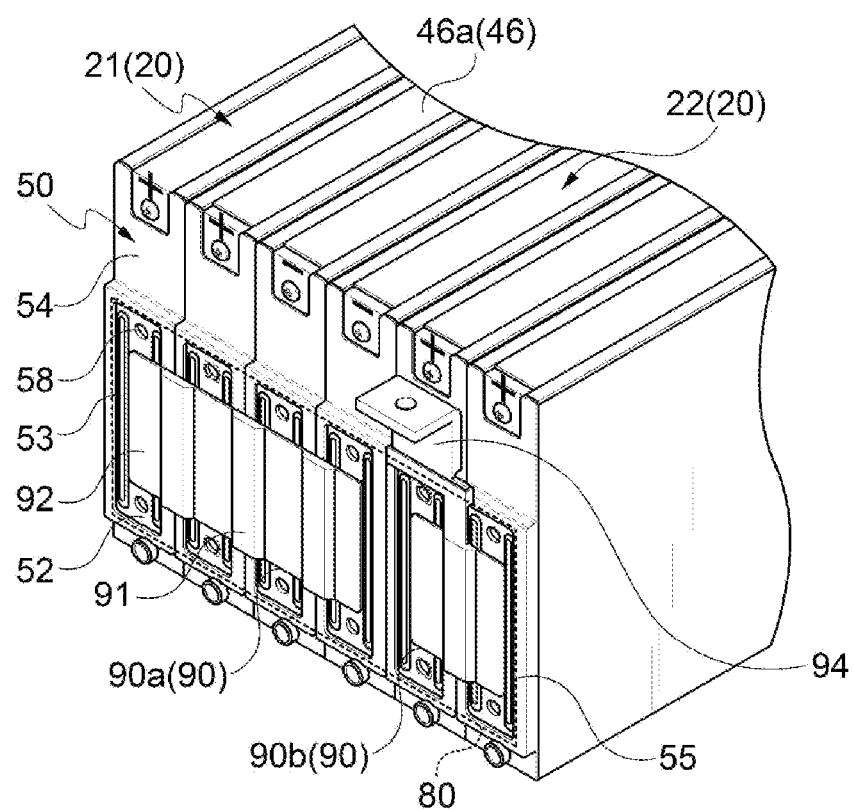
FIG. 8 illustrates transparently a bus bar frame in a bus bar assembly mounted on a plurality of sub-modules of a battery module according to an embodiment of the present disclosure.

FIGS. 5 and 6 illustrate a plurality of sub-modules and a bus bar assembly of a battery module according to an embodiment of the present disclosure. FIG. 7 is a rear view of a bus bar assembly that is one configuration of a battery module according to an embodiment of the present disclosure. FIG. 8 illustrates transparently a bus bar frame in a bus bar assembly mounted on a plurality of sub-modules of a battery module according to an embodiment of the present disclosure.

The battery module 1 may include the bus bar assembly 70.

The bus bar assembly 70 may electrically connect the internal bus bars 52 of the plurality of sub-modules 20 to each other. The bus bar assembly 70 may be mounted on the plurality of sub-modules 20 and electrically connected to the internal bus bars 52. For example, when the bus bar assembly 70 is mounted on the plurality of sub modules 20, bus bars 90 of the bus bar assembly 70 may contact with the internal bus bars 52 of the plurality of sub modules 20.

The bus bar assembly 70 may be separated from the plurality of sub-modules 20 at a specific temperature or higher. For example, when heat of the sub-module 20 is transferred to the bus bar assembly 70 and a temperature of the bus-bar assembly 70 is higher than or equal to a specific temperature, the coupling between a fixing portion 84 and the sub-module 20 may be released, and the bus bar assembly 70 may be separated from the plurality of sub-modules 20.

That is, when the sub-module 20 is overheated, the present disclosure can prevent an electrical damage, heat diffusion, and overheating between the adjacent sub-modules 20 by releasing the electrical connection between the sub-module 20 and the bus bar assembly 70.

The specific temperature is not limited. The specific temperature may be specified as a temperature interval. A specific temperature interval may include a melting temperature of a bus bar frame 80. For example, when the bus bar frame 80 is formed of a resin material, the specific temperature interval may be between 100° C. and 200° C. The bus bar frame is not, however, limited to be formed of a resin. Other materials with different melting points may be used to form the bus bar frame 80.

For example, the specific temperature interval may be between 120° C. and 130° C. The specific temperature interval may be selected to be lower than an overheating temperature at which an explosion may occur in the battery cell 30 of the sub-module 20. However, the numerical value of the specific temperature interval is not limited.

The bus bar assembly 70 may include the bus bar frame 80 and the bus bar 90. The bus bar 90 of the bus bar assembly 70 may be referred to as an "external bus bar".

The bus bar frame 80 may be detachably coupled to the plurality of sub-modules 20. The bus bar frame 80 may include a frame body 82 and the fixing portion 84. The external bus bar 90 may be fixed or coupled to the frame body 82. The fixing portion 84 may be detachably coupled to the sub-module 20.

When the bus bar assembly 70 is coupled to the plurality of sub-modules 20, the frame body 82 may cover the internal bus bar 52 of the bus bar unit 50. Through this, the bus bar frame 80 may cover the external bus bar 90 and the internal bus bar 52 so that the external bus bar 90 and the internal bus bar 52 are not exposed to the outside. That is, the bus bar frame 80 may perform a function of the insulation cover 18 (see FIG. 2).

The bus bar frame 80 may include a resin material. For example, the bus bar frame 80 may include at least one of modified polyphenylene oxide (MPPO), polypropylene (PP), and polybutylene terephthalate (PBT). At least a portion of the bus bar frame 80 may be formed of a resin material. For example, the fixing portion 84 of the bus bar frame 80 may include a resin material.

For another example, a portion adjacent to the fixing portion 84 in the fixing portion 84 and the frame body 82 may be formed of a resin material. As another example, the bus bar frame 80 may be entirely formed of a resin material. As another example, the fixing portion 84 may be coupled to the frame body 82 through a separate configuration formed of a resin material. As another example, a support leg 86 may be formed of a resin material. The material of the bus bar frame 80 is not limited to a resin material as long as the fixing portion 84 can be released at a set temperature.

The external bus bar 90 may be embedded into the bus bar frame 80. The external bus bar 90 may contact the internal bus bars 52 of the plurality of sub-modules 20.

The external bus bar 90 may include a first body 91 and a second body 92. The first body 91 may be accommodated in the bus bar frame 80. The second body 92 may be exposed to the outside of the bus bar frame 80. The second body 92 may be formed to extend from the first body 91. For example, the second body 92 may be bent and extended from the first body 91 toward the sub-module 20.

The second body 92 may be configured to be exposed from a rear surface 82a (see FIG. 10) of the frame body 82. The rear surface 82a (see FIG. 10) of the frame body 82 may refer to an inner surface of the frame body 82. That is, the rear surface 82a (see FIG. 10) of the frame body 82 may face the internal bus bar 52 of the bus bar unit 50. The second body 92 may face the internal bus bar 52. For example, the second body 92 may be in contact with the internal bus bar 52. The second body 92 may protrude further toward the sub-module 20 than the frame body 82.

The external bus bar 90 and the bus bar frame 80 may be integrally formed through double injection. In this process, the first body 91 of the bus bar 90 may be accommodated by and fixed to the bus bar frame 80, and the second body 92 of the bus bar 90 may be exposed to the outside of the bus bar frame 80 and may face the internal bus bar 52.

A plurality of external bus bars 90 may be provided. The plurality of first and second bodies 91 and 92 may be alternately disposed. That is, the plurality of first bodies 91 may be fixed and disposed to be spaced apart from each other inside the frame body 82 of the bus bar frame 80, and the plurality of second bodies 92 may be disposed to be spaced apart from each other outside the frame body 82 of the bus bar frame 80.

The plurality of external bus bars 90 may be spaced apart from each other. The external bus bars 90 may be configured such that the plurality of first and second bodies 91 and 92 are connected to each other, but the plurality of first bodies 91 are spaced apart from each other and the plurality of second bodies 92 are spaced apart from each other. Through this, an insulation distance between the plurality of external bus bars 90 may be sufficiently secured.

A gap between the plurality of second bodies 92 may correspond to the internal bus bar 52 of the plurality of sub-modules 20. That is, when the bus bar assembly 70 is mounted on the plurality of sub-modules 20, the plurality of second bodies 92 will contact the internal bus bars 52 of the corresponding plurality of sub-modules 20, respectively.

For example, the plurality of second bodies 92 may contact the plurality of internal bus bars 52 through a connection space 56 (see FIG. 10) of the bus bar unit 50. Through this configuration, the plurality of sub-modules 20 may be electrically connected, and at least one battery cell 30 (see FIG. 4) is embedded in each sub-module 20.

The plurality of sub-modules 20 may include a first sub-module 21 and a second sub-module 22. At one end of the module case 10 (see FIG. 2), the electrode tab 32 of the first sub-module 21 has a first polarity, and the electrode tab 32 of the second sub-module 22 has a second polarity. The first and second polarities may indicate a positive polarity and a negative polarity, respectively.

A plurality of first sub-module 21 and a plurality of second sub-module 22 may be provided. The plurality of first and second sub-modules 21 and 22 may be alternately arranged. For example, a pair of first sub-modules 21 and a pair of second sub-modules 22 may be alternately arranged. In other words, a pair of second sub-modules 22 may be disposed between a pair of first sub-modules 21 and another pair of first sub-modules 21.

The bus bar assembly 70 may include a first external bus bar 90a and a second external bus bar 90b. For example, the external bus bar 90 may include the first external bus bar 91a and the second external bus bar 90b.

The first external bus bar 90a may include two pairs of second bodies 92 and a plurality of first bodies 91 connecting the two pairs of second bodies 92. The two pairs of second bodies 92 of the first external bus bar 90a may be in contact with the internal bus bars 52 connected to one pair of first sub-modules 21 and the internal bus bars 52 connected to one pair of second sub-modules 22. For another example, the first external bus bar 90a may include the plurality of second bodies 92 that contact the internal bus bars 52 connected to the plurality of first sub-modules 21 and the internal bus bars 52 connected to the plurality of second sub-modules 22.

The second bus bar 90b may include a pair of second bodies 92 and the first body 91 connecting the pair of second bodies 92 to each other. The pair of second bodies 92 of the second bus bar 90b may contact the internal bus bars 52 connected to the pair of first sub-modules 21.

The second bus bar 90b may be disposed on the bus bar frame 80 to be spaced apart from the first bus bar 90a. The second bus bar 90b may include a terminal 94 exposed to the outside of the battery module 1. The battery module 1 may be electrically connected to the outside through the terminal 94. The first and second sub-modules 21 and 22, that are configured such that one pair of first sub-modules 21 and one pair of second sub-modules 22 are alternately arranged to have different polarities at one end of the case body 12 (see FIG. 2), may be connected in series through the first and second bus bars 90a and 90b.

Figure 9:
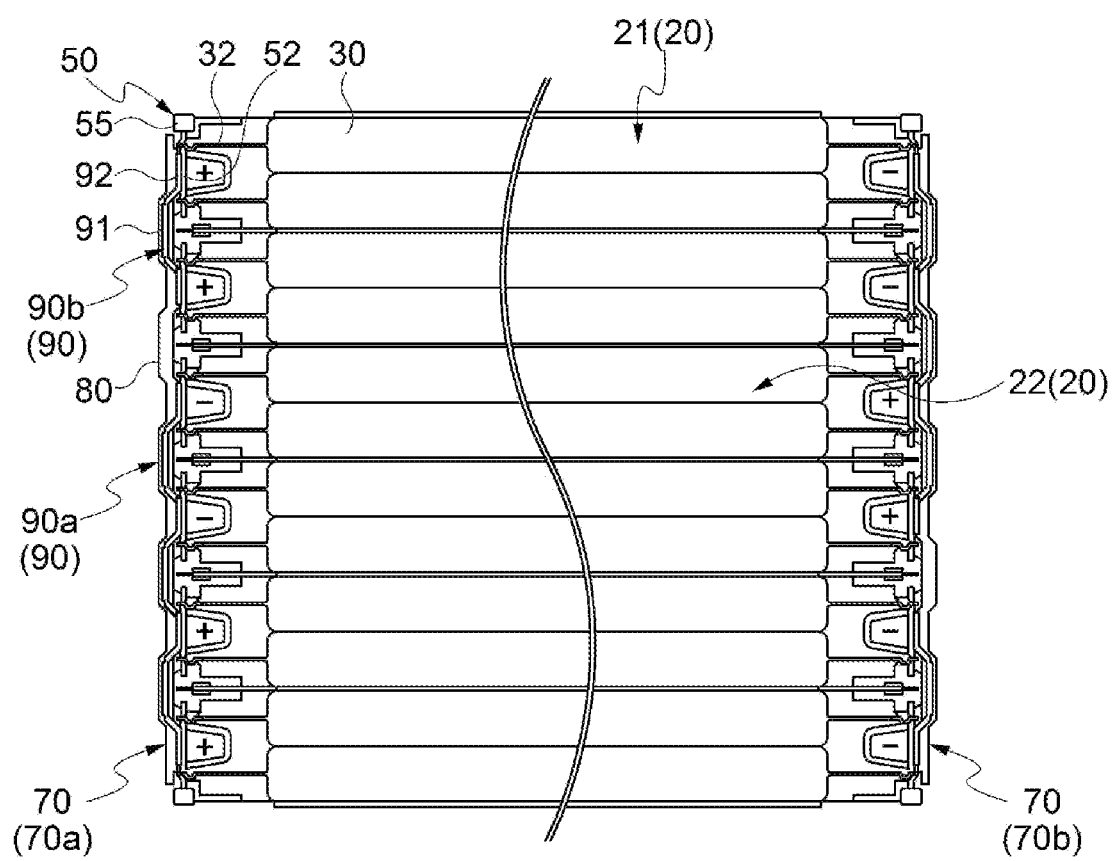
FIG. 9 illustrates a connection configuration between a plurality of sub-modules and a bus bar assembly of a battery module according to an embodiment of the present disclosure.

FIG. 9 illustrates a connection relationship between a plurality of sub-modules and a bus bar assembly of a battery module according to an embodiment of the present disclosure. The following description is given with reference to the figures above.

The bus bar assembly 70 may connect in series the plurality of sub-modules 20. For example, the bus bar assembly 70 may be alternately disposed on one side and other side of the plurality of sub-modules 20. One side of the plurality of sub-modules 20 may mean an end or a front end of the case body 12 (see FIG. 2). The other side of the plurality of sub-modules 20 may mean the other end or the rear end of the case body 12 (see FIG. 2).

The bus bar assembly 70 may include a first bus bar assembly 70a disposed at one side of the plurality of sub-modules 20 and a second bus bar assembly 70b disposed at the other side of the plurality of sub-modules 20. The first and second external bus bars 90a and 90b of the first and second bus bar assemblies 70a and 70b may be alternately disposed along the stacking direction of the plurality of sub-modules 20. Through such a configuration of the bus bar assembly 70, the plurality of sub-modules 20 may be connected in series.

Figure 10:
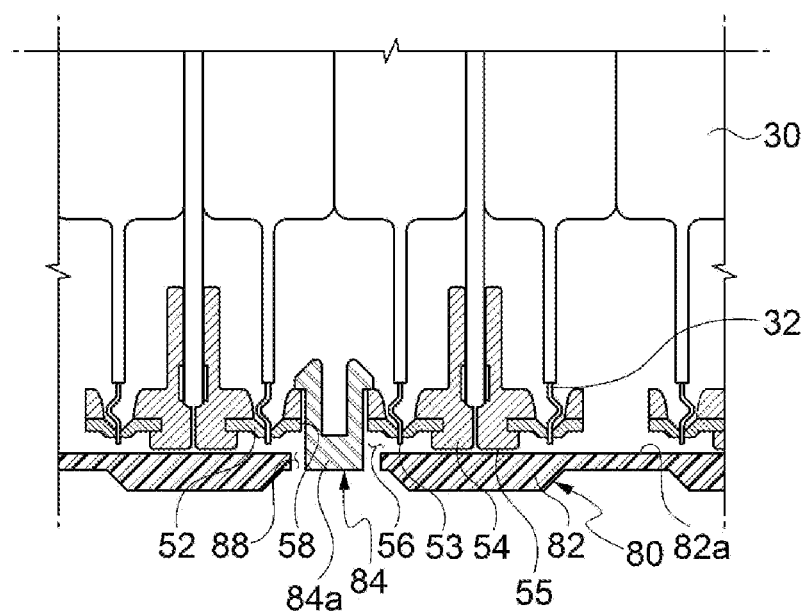
FIG. 10 is a cross-sectional view taken along A-A' of FIG. 5.

FIG. 10 is a cross-sectional view taken along A-A' of FIG. 5. The following description is given with reference to the figures above.

The bus bar frame 80 may include at least one fixing portion 84. The bus bar frame 80 may be detachably coupled to the plurality of sub-modules 20 through at least one fixing portion 84. The fixing portion 84 may be formed to protrude from the rear surface 82a of the frame body 82 toward the sub-module 20. The fixing portion 84 may be detachably fixed to the plurality of sub-modules 20.

The fixing portion 84 may be melted by the overheating of the sub-module 20 or the like. That is, when the bus bar assembly 70 receives heat from the sub-module 20 and reaches a predetermined temperature or more, the fixing portion 84 may be melted, the coupling between the sub-module 20 and the fixing portion 84 may be released, and the electrical connection between the bus bar assembly 70 and the sub-module 20 may be released. Through this, it is possible to prevent the overheating from expanding between the plurality of sub-modules 20 and prevent a continuous explosion of the plurality of sub-modules 20.

The plurality of sub-modules 20 may include an insertion hole 58 into which the fixing portion 84 is inserted. The number of insertion holes 58 may correspond to the number of fixing portions 84. When the plurality of fixing portions 84 are provided, a plurality of insertion holes 58 may also be formed. However, the number of insertion holes 58 and the number of fixing portions 84 do not need to be the same as each other. For example, the number of insertion holes 58 may be more than the number of fixing portions 84, and at least one fixing portion 84 may be selectively inserted into the plurality of insertion holes 58.

The insertion hole 58 may be included in the internal bus bar 52. For another example, the insertion hole 58 may be formed in the unit body 54 of the bus bar unit 50. At least a part of the fixing portion 84 may be inserted into the sub-module 20 through the insertion hole 58. Through this, a heat transfer surface area through which the heat generated in the sub-module 20 is transferred to the plurality of fixing portions 84 may be increased.

As illustrated in FIGS. 6 and 8, the insertion hole 58 may be disposed in each of the plurality of sub-modules 20. By inserting the plurality of fixing portions 84 into some of the plurality of insertion holes 58, the bus bar assembly 70 may be fixed to the sub-module 20. It is illustrated that the six sub-modules 20 are arranged, by way of example. However, when more or fewer sub-modules 20 are arranged, the electrical connection between the sub-modules 20 can be easily performed by distinguishing the insertion hole 58, into which the fixing portion 84 is inserted, among the plurality of insertion holes 58.

The fixing portion 84 may include a snap-fit structure. The fixing portion 84 may be inserted into the insertion hole 58 and fixed through the snap-fit structure. Through this, the bus bar assembly 70 may be detachably mounted or coupled to the plurality of sub-modules 20.

The plurality of fixing portions 84 may be disposed at the upper end and lower end of the second body 92, respectively. Since the fixing portions 84 are respectively disposed at the upper part and the lower part of the second body 92 with respect to the plurality of second bodies 92 arranged in the left-right direction, a contact state between the internal bus bar 52 and the second body 92 can be stably maintained. The left-right direction may be parallel to the direction in which the plurality of sub-modules 20 are arranged.

The bus bar frame 80 may include the support legs 86 (see FIG. 7). Through the support legs 86, the fixing portion 84 may be supported on the frame body 82. The support leg 86 may be one configuration of the fixing portion 84. The support leg 86 may connect a part of a perimeter of a body 84a of the fixing portion 84 to the frame body 82. The body 84a of the fixing portion 84 may be referred to as a "fixing portion body".

The support leg 86 may be one configuration of the frame body 82. While the bus bar frame 80 is doubly injected together with the bus bar 90, the frame body 82, the support legs 86, and the fixing portion 84 may be integrally formed. The support legs 86 may extend from the fixing portion 84 and lead to the frame body 82. For example, the support leg 86 may connect the fixing portion 84 and the frame body 82.

The bus bar frame 80 may include a separation hole 88 (see FIGS. 7 and 10). The separation hole 88 may be an opening formed in the frame body 82. The separation hole 88, i.e., the separation hole 88 of the fixing portion 84 may be formed in a remaining portion, in which the support leg 86 is not formed in the perimeter of the body 84a of the fixing portion 84. In the separation hole 88, the fixing portion 84 and the frame body 82 may be spaced apart from each other. The separation hole 88 may be formed in a circumferential direction with respect to the support leg 86 with the fixing portion 84 as a center.

The separation hole 88 may be positioned between the fixing portion 84 and the frame body 82. The separation hole 88 may refer to an opening formed by being surrounded by the fixing portion 84, the frame body 82, and the support leg 86. The fixing portion 84 may be surrounded by the separation hole 88 and the support leg 86. The separation hole 88 may be formed in a portion of the perimeter of the fixing portion body 84a. The support leg 86 may form a shape surrounded by the separation hole 88, the fixing portion body 84a, and the frame body 82. The fixing portion body 84a may be spaced apart from the frame body 82 by the separation hole 88 and may be connected to the frame body 82 through the support legs 86.

The support leg 86 and the separation hole 88 may be alternately arranged around the fixing portion 84. The fixing portion 84 may be supported on the frame body 82 only through the support legs 86. When the sub-module 20 is overheated and heat is transferred to the fixing portion 84, at least one of the fixing portion 84 and the support leg 86 may be melted. When at least one of the fixing portion 84 and the support leg 86 is melted, the bus bar assembly 70 may be separated from the sub-module 20.

Figure 11:
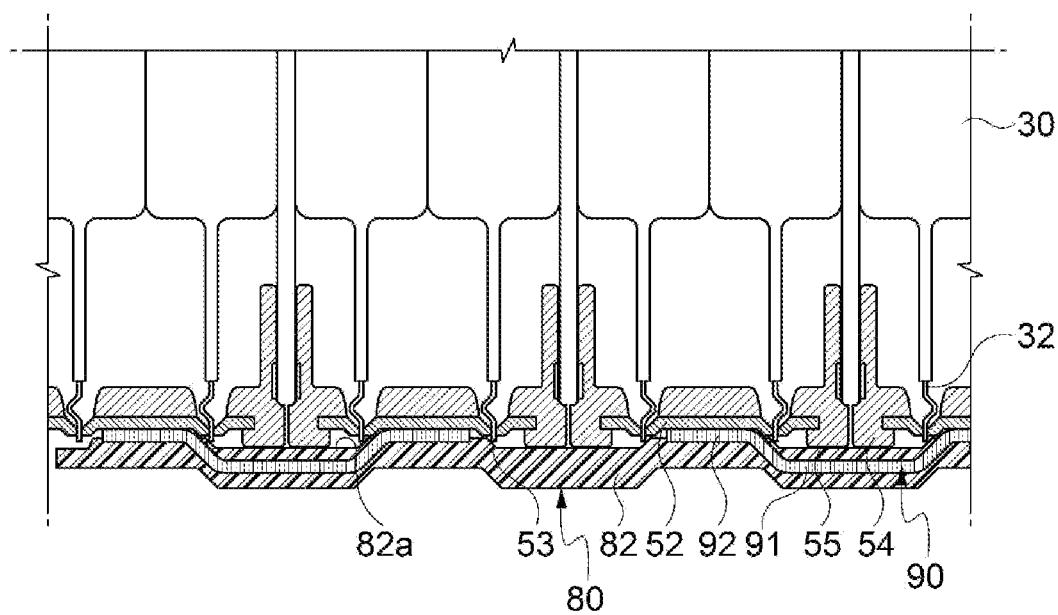
FIG. 11 is a cross-sectional view taken along B-B' of FIG. 5.

FIG. 11 is a cross-sectional view taken along B-B' of FIG. 5. The following description is given with reference to the figures above.

The bus bar unit 50 may include an edge portion 55.

The edge portion 55 may be configured to protrude more toward the bus bar assembly 70 than the internal bus bar 52 mounted on the unit body 54. That is, the front face of the internal bus bar 52 may be configured to be more concave than the edge portion 55. The front face of the internal bus bar 52 may refer to an outer face of the internal bus bar 52. Alternatively, the front face of the internal bus bar 52 may indicate a face facing the bus bar frame 80.

Through this, the bus bar unit 50 may form the connection space 56 (see FIG. 10) between the front face of the internal bus bar 52 and the edge portion 55. In the connection space 56 (see FIG. 10), the second body 92 may be positioned. The second body 92 may protrude more than a face from the frame body 82 toward the sub-module 20.

Through this configuration, the plurality of second bodies 92 of the external bus bar 90 may be stably inserted into the connection space 56 and may contact the plurality of internal bus bars 52, respectively. In addition, the edge portion 55 may be configured to contact the rear surface 82a of the frame body 82 so that the second body 92 of the external bus bar 90 does not excessively pressurize the internal bus bar 52.

An operation of the battery module according to the above configuration is described below. The following description is given with reference to the figures above.

The bus bar assembly 70 may be mounted on the plurality of sub-modules 20 through at least one fixing portion 84. Through this mounting, the internal bus bars 52 of the plurality of sub-modules 20 contact and are electrically connected to the second bodies 92 of the external bus bars 90.

When the overheating occurs in at least some sub-modules 20 while the battery module 1 operates, heat is transferred to the bus bar assembly 70. The configuration of at least one of the fixing portion 84 and the support leg 86 supporting the fixing portion 84 is melted when it is higher than or equal to a predetermined temperature while the heat is transferred.

When the fixing portion 84 or the support leg 86 supporting the fixing portion 84 is melted, the mounting of the bus bar assembly 70 with respect to the plurality of sub-modules 20 may be released, and the electrical connection of the plurality of sub-modules 20 may be disconnected and may be forcibly stopped.

Through this, the present disclosure can prevent overheating, explosion, and explosion transition of the plurality of sub-modules 20 and thus can prevent an expansion of loss and stably drive the battery module.

Although the embodiments have been described with reference to a number of illustrative embodiments thereof, numerous other modifications and embodiments may be devised by those skilled in the art that will fall within the scope of the principles of the present disclosure. In particular, many variations and modifications are possible in the component parts and/or arrangements of the subject combination arrangement which are within the scope of the present disclosure as defined in the appended claims.

Some embodiments or other embodiments of the present disclosure described above are not mutually exclusive or distinct from each other. Configurations or functions of some embodiments or other embodiments of the present disclosure described above can be used together or combined with each other.

It is apparent to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

What is claimed is:
1. A battery module comprising:
a plurality of sub-modules each including at least one battery cell and an internal bus bar electrically connected to an electrode tab of the at least one battery cell;
a bus bar assembly configured to connect the internal bus bars of the plurality of sub-modules; and
a module case including a front cover,
wherein the bus bar assembly is positioned between the front cover and the plurality of sub-modules,
wherein the bus bar assembly includes:
a bus bar frame detachably mounted on the plurality of sub-modules; and
an external bus bar coupled to the bus bar frame and configured to electrically connect sub-modules adjacent to each other among the plurality of sub-modules,
wherein the bus bar frame includes a frame body to which the external bus bar is coupled,
wherein the external bus bar includes:
a first body coupled to the frame body, the first body being accommodated in the module case; and
a second body extending from the first body, the second body being connected to the internal bus bars, the second body being accommodated in the module case,
wherein the first body protrudes towards the front cover from the second body, and the first body is surrounded by the frame body, wherein the second body is exposed from a rear surface of the frame body, and the second body protrudes farther toward the plurality of sub-modules than the frame body, wherein the bus bar frame includes a plurality of fixing portions protruding from the frame body, and the plurality of sub-modules include insertion holes formed on a face of the plurality of sub-modules facing the external bus bar, and wherein the plurality of fixing portions are inserted into the insertion holes, thereby detachably coupling the bus bar frame to the plurality of submodules, melting of the plurality fixing portions releases the electrical connection between the bus bar assembly and the plurality of sub-modules.

2. The battery module of claim 1, wherein the plurality of fixing portions include a resin material.

3. The battery module of claim 1, wherein when the bus bar frame is heated to a temperature higher than or equal to a predetermined temperature, the bus bar frame is separated from the plurality of sub-modules.

4. The battery module of claim 3, wherein when the bus bar frame is heated to a temperature higher than or equal to a predetermined temperature, the predetermined temperature is 120° C. to 130° C., and the bus bar frame includes a resin material.

5. The battery module of claim 1, wherein when the plurality of fixing portions are heated to a temperature higher than or equal to a predetermined temperature, a coupling between the plurality of sub-modules and the bus bar frame is released.

6. The battery module of claim 1, wherein when the plurality of fixing portions are heated to a temperature higher than or equal to a predetermined temperature, the plurality of fixing portions are melted and the bus bar frame is detached from the sub-modules.

7. The battery module of claim 1, wherein the bus bar frame further includes a support leg connecting the plurality of fixing portions and the frame body.

8. The battery module of claim 7, wherein the bus bar frame further includes a separation hole that is an opening formed in the frame body and is formed between the at least one fixing portion and the frame body.

9. The battery module of claim 8, wherein the at least one fixing portion includes a fixing portion body that is spaced apart from the frame body by the separation hole and is connected to the frame body by the support leg, and wherein the at least one fixing portion forms a snap-fit structure and is coupled to an insertion hole formed in the plurality of sub-modules.

10. The battery module of claim 1, wherein the bus bar frame is connected through the internal bus bar.

11. The battery module of claim 1, wherein each of the plurality of fixing portions is disposed at an upper end and a lower end of the second body, respectively.

12. The battery module of claim 1, wherein the plurality of sub-modules include a unit body on which the internal bus bar is mounted, the unit body including an edge portion that protrudes more toward the bus bar frame than the internal bus bar, the unit body forming a connection space between the internal bus bar and the edge portion of the unit body, and wherein the second body is inserted into the connection space and protrudes more toward the plurality of sub-modules than the bus bar frame to contact the internal bus bar.

13. The battery module of claim 1, wherein the frame body covers the internal bus bars exposed to an outside of the plurality of sub-modules, wherein the first body includes a plurality of first bodies, wherein the second body includes a plurality of second bodies, and wherein the plurality of first bodies are spaced apart from each other, the plurality of second bodies are spaced apart from each other, and the plurality of first bodies and the plurality of second bodies are alternately disposed, the plurality of second bodies contact the internal bus bars of the plurality of sub-modules, respectively.

14. The battery module of claim 1, wherein each of the plurality of sub-modules further includes a module housing accommodating the at least one battery cell, and both ends of the module housing are adjacent to the internal bus bar.

15. The battery module of claim 1, further comprising:

a front bus bar assembly as the bus bar assembly; and a rear bus bar assembly as the bus bar assembly, wherein the module case includes a rear cover, wherein the front bus bar assembly is positioned between the front cover and the plurality of sub-modules, and wherein the rear bus bar assembly is positioned between the rear cover and the plurality of sub-modules.

* * * * *